(No Model.)  3 Sheets—Sheet 1.

O. ROTHROCK.
FEED WATER HEATER.

No. 328,902. Patented Oct. 20, 1885.

Witnesses:
John Ruckle
A. L. Duffy

Oscar Rothrock,
Inventor
By O. E. Duffy
Attorney (No Model.) 3 Sheets—Sheet 2.

O. ROTHROCK.
FEED WATER HEATER.

No. 328,902. Patented Oct. 20, 1885.

Witnesses:
Oscar Rothrock,
Inventor:

(No Model.) 3 Sheets—Sheet 3.

O. ROTHROCK.
FEED WATER HEATER.

No. 328,902. Patented Oct. 20, 1885.

Witnesses:
John Buckler
A. L. Duffy

Oscar Rothrock,
Inventor:
By O. E. Duff
Attorney

UNITED STATES PATENT OFFICE.

OSCAR ROTHROCK, OF NEW YORK, N. Y.

FEED-WATER HEATER.

SPECIFICATION forming part of Letters Patent No. 328,902, dated October 20, 1885.

Application filed June 9, 1885. Serial No. 168,167. (No model.)

*To all whom it may concern:*

Be it known that I, OSCAR ROTHROCK, a citizen of the United States, a resident of New York city, in the county of New York and State of New York, have invented certain new and useful Improvements in Feed-Water Heaters; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to feed-water heaters for locomotive, stationary, and marine boilers generally, but is especially adapted to locomotives and portable engines. Its object is to supply steam-boilers with feed-water of a high temperature, utilizing all waste heat both from the combustion-chamber and from the exhaust-steam, so that when an engine or boiler is standing temporarily inactive the heat from the fire, now constantly going to waste, may be utilized to heat or assist the exhaust in heating an additional supply of water for use when the engines are working, thus enabling us to carry or maintain a slow, heavy, or, in some cases, almost banked fire, instead of a forced fire, and thereby greatly reducing the expense for fuel and securing all of the advantages incident to the use of boiling feed-water.

To these ends the invention consists of a tank, shell, or dome, made of steel or iron boiler-plates, secured to the outside of the boiler, forming either a separate structure or having a connection at the fire over a door or opening, or by means of doors, as shown in these figures, or with pipes carrying the exhaust to and from the heater or reservoir, with means for controlling the action of the exhaust, and of the fire upon the water in the boiler and heater, and the action of the pumps, &c. This reservoir is supplied with safety-valve and steam-gage, water-gages, and water-glass of usual patterns, when necessary, with pump and pipe connections to the boiler or boilers and to cold-water supply, with a suitable cock or pipe for emptying the heater or drawing water off from it, with a lagging and covering consisting of wood, asbestus, felt, or other suitable materials, with one or two—usually two—pipes within the heater-shell, carrying either water or exhaust-steam, the said pipes being made of copper, brass, or iron, one-fourth or one-half the thickness of the pipes carrying the water and steam to and from the heater. This tank, dome, or reservoir construction is so secured or arranged that an intermediate space is left in under for the circulation of hot air and gases from a fire or from the fire-chamber, this heating or utilizing of this portion of the waste heat being usually regulated by revolving, sliding, or hinged doors on the heater or furnace, or both. The feed-pump and pipe-connections are supplied with valves and stop-cocks, which can be controlled from the engine room or cab, so that the same pump may supply either heater or boiler, or so the heater may be filled at intervals, or water pumped constantly through the heater-pipes. The exhaust pipes or pots in the smoke-box are supplied with a valve or cock, so the engines may exhaust into stack while the heater is being filled with cold water, and to enable the engine-man to blow up the fire with the exhaust or throw it up the discharge-pipe or stack at will.

The arrangement of the various parts of my invention are briefly set forth in the above statements, and will be hereinafter more fully explained and then pointed out in the claims.

In the drawings, Figure 1 is a side elevation of a locomotive with my heater and its connecting pipes and valves. Fig. 2 is a section of the heater with double coil of exhaust-pipes. Fig. 3 is a sectional view through the boiler and heater, showing the passage and valve between the boiler-furnace and the bottom of the heater. Fig. 4 is a section through heater, showing some of the details. Fig. 5 is a modification in which the water passes through the pipe, and the exhaust-steam and heat of the furnace enter the tank. Fig. 6 shows the general arrangement of the heater as applied to a small portable or locomotive type of boiler. Fig. 7 shows the heater in section as a box around the front or fire door. Fig. 8 shows an end view of a boiler with a box portion of the heater around the door and the dome of the heater above the box. Fig. 9 shows the manner of applying the pipes to the exhaust-pots in the smoke-box.

Fig. 1 shows the general arrangement of the heater, tank, or dome on a locomotive-engine, controlling devices, and connections being adapted to that service, H being the heater-tank; W G, the water-glass; G, the steam-gage; V, safety-valve; a, the pipes carrying the exhaust from the ports or exhaust-pots, one of the pipes only being shown. B is rod extending from the cab to the plate valve or cock in the pipe, pots, or exhaust-nozzles; $a'$, exit of the exhaust from heater; C, cocks or check-valves in all pipes; D, pipe from the pump to the heater; $D'$, the pipe from pump to boiler; E, injector and its pipes to both heater and boiler; F, rod from cab to the cocks located in the feed-pipes between pump and boiler and between pump and heater, which is usually so connected to each cock or valve that the opening of one closes the other; I, pipe connecting the steam-drum or steam-space of boiler and heater, same being supplied with a valve. K is one of the feed-water pipes from heater to boiler, same being supplied with a check-valve to regulate the flow when feeding at high temperature. N is the drip pipe or cock for emptying or drawing water from the heater, and S boiler safety-valve.

Fig. 2 shows a section of the heater carrying a double coil; the stay rods or bolts; a space or opening, W, under the heater, or, properly speaking, between the shells or walls of the heater and boiler; the manner of attaching it to one form of boiler by ears, (said ears having first been riveted or tap-bolted to the heater and boiler-shells and a bolt then put through the ears, which can make an expansion-joint;) one of the revolving doors with its rod $P'$ extending to the side of engine or boiler to turn the door to permit the fire or hot gases to come out against the heater, or to dump coal into the furnace which has first been shoveled into the space or compartment between through a front door. (Shown in Fig. 3.)

Fig. 3 is a sectional view through the boiler and heater, M being a door in front of and in the wall between the heater and boiler that may be used instead of the ordinary fire-door $M'$, or in connection with it. $M^2$ is a revolving door or door hinged to the top of the boiler within the space under the heater, the said space being closely walled up on all sides and designed as a place for the circulation of the hot air and gases from the combustion-chamber, and for the passage of steam from the exhaust-ports also, when desired. $a^2$ is the double coil within this tank. $a'$ is a single outlet-pipe tap-bolted to the shell, the pipe within the heater in this instance being made with it and secured to the inner side of the shell. L is the lagging or the covering for any or all heaters; W, the hot-air compartment or intermediate space, extending under the entire heater in this case.

Fig. 4 shows a double coil of pipe, through which the exhaust passes, the pipes and other parts being shown in section, the water to be stored in the shell in this instance, and having a small air-chamber between the plates. $y$ is exit of the exhaust; $y$ $y$, pipes carrying the exhaust into the heater, and $v$ safety-valve.

Fig. 5 shows the heater, carrying a double-coil, R, through which the feed-water passes, the hot air from the fire-chamber circulating in and the steam from the exhaust-pots passing through the heated shell. L is the lagging; Z, pipes carrying exhaust from the engines; $Z'$, the exit or pipe extension, in which I place a valve or large cock, $Z^2$, to be opened and closed as the circumstances require. R is the double coil pipe, carrying water, and $R'$ is a single inlet water-pipe, the double (or single) coil of pipe in this instance being secured to the inner side of the shell, and the extensions or outlet and inlet pipes being tap-bolted or otherwise secured to the circle or side plates by suitable bolts, making a water-tight joint with a ring of packing, the cock or pipe N (shown in Fig. 1) being located at the bottom and left open, or opened occasionally, when blowing steam through shell. This construction I do not claim in this application, but have applied for a patent for the same in my application filed September 8, 1885, Serial No. 176,519.

Fig. 6 shows the general arrangement of the heater as applied to a small portable or locomotive type of boiler, or when used separately, the inside fire-door being shown through the broken-out portion of side. In this construction the grate-bars and ash-pit may or may not come out to the front, as shown, and the fire may or may not be built directly under the heater, as desired, and the heater may in some cases be constructed in one piece with the boiler-shell and in others will be made separate. The tap-bolts along the side show one manner of attaching it to the boiler by an extension of the sheets forming the heater. The dividing line between heater and boiler is also indicated by the line of bolts. $a$ is the pipe conducting exhaust to the heater, and $a'$ the exit or outlet. It will be understood that all of the various pipes and connections shown in the other figures take their proper position around this.

Fig. 7 shows the heater in section as a box around the front or fire door. W is the space or chamber for the circulation of the hot air and gases when the inner fire door (or doors, as case may be) is opened and outer door closed, which makes the heater indirectly a part of the combustion-chamber. $M^3$ is the inner doors, which are usually hinged to the boiler, but which can be lowered into the receptacle $W^2$ or slid out of the way, or be turned by a rod, as shown in one figure. When they are swung, &c., the receptacle $W^2$ is omitted, the heater-plates setting in close to the boiler-shell, which makes best arrangement. Both sets of doors are opened to attend fire and opened or closed to regulate the action of the fire on the water in the heater-shell or heater-pipes and the water in the steam-boiler.

Figure 6:
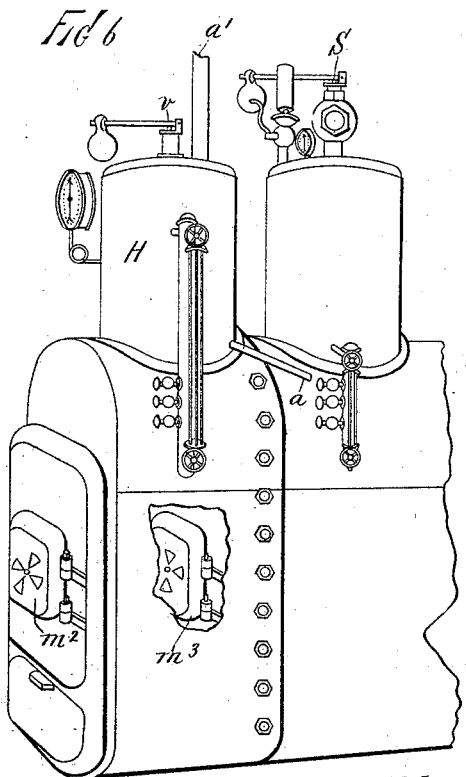

When the heater has a jacket and fire-box I provide a "hand-hole" at each lower front corner, and when it has no lower jacket below a crown-sheet this hand-hole is placed at bottom of water-space, secured in usual manner. In the construction shown in Fig. 6 the heater has a water-jacket extending to bottom of boiler on all sides, and has a crown-sheet securely braced and stayed, with a bottom grate and fire under crown-sheet, with an ash-pan, and is a perfect heater structure. The outside sheet forming the heater, or the side and top of shell, extends out and is fitted over the boiler-shell and secured to it by the numerous tap-bolts. The usual ears and expansion-joint connections may, however, be substituted for the band of sheet metal, if desired. The crown-sheet and water-jacket extensions of this form may be omitted, or the crown-sheet retained and the lower extensions of the water-spaces omitted in certain cases, when the heater becomes a box around the usual fire-door opening—that is, a structure with a dome or tank above, and having single sheets of metal forming the parts below it, the latter serving to retain and direct the hot air against the heater when the inner door (or doors) is opened. The crown-sheet may, however, as stated above, also be omitted when the water is carried in the pipes coiled within the shell and the gases or hot products of combustion from the fire-box are permitted to circulate about the pipes, and, if desired, the exhaust also, at intervals.

Figure 8:
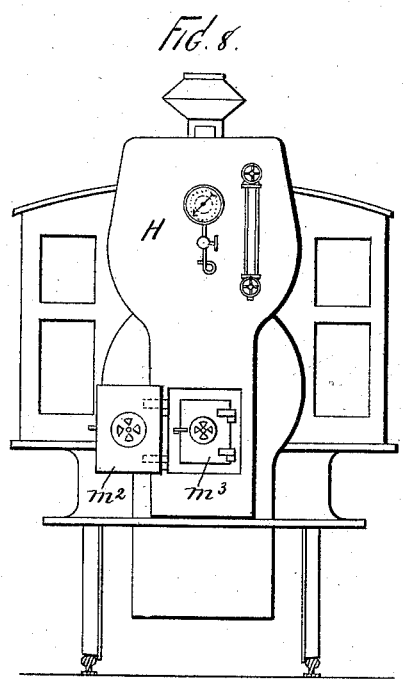
Fig. 8 shows an end view of a locomotive or other boiler with a box portion of the heater around the door, with the dome of the heater above the said box, or downward-extending jacketed box portion, as the case may be, with the outside and the inside doors, steam-gage, water-glass, and adjacent parts, M² being the outside door, and M³ the inner door.
Figure 7:
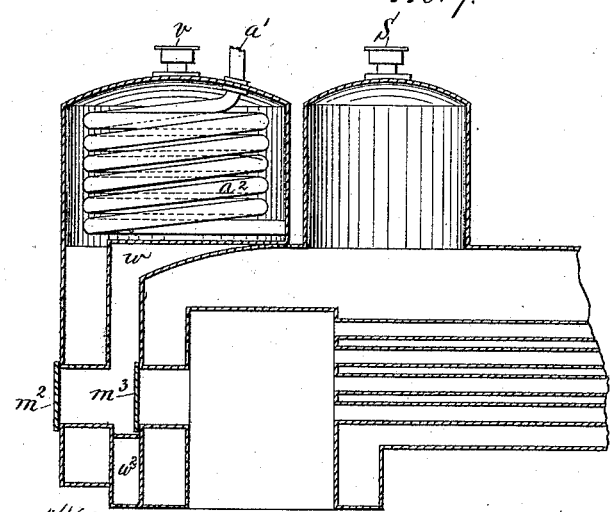
Figure 9:
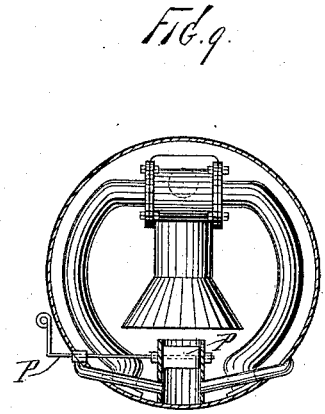
Fig. 9 shows the manner of applying the pipes to the exhaust-pots in the smoke-box, the plate-valve P, and its arm or rod for turning the valve, the opening and closing of same being usually accomplished by means of the rod B.

The form of heater or construction shown in Figs. 7 and 8 is made either with or without a water-jacket down the front and sides—usually without it—a simple box around the door, consisting of a single sheet or plate of cast or wrought metal riveted or tap-bolted edgewise to the boiler-shell, serving to direct the heat to or under the dome, the fire-doors being hinged to the face of these plates, or both boiler and heater having doors. This manner of applying the heater is especially applicable to the present form of locomotives, and where it is desirable to make as few changes as possible, and to portable boilers for agricultural uses where first cost is an important consideration.

Figure 5:
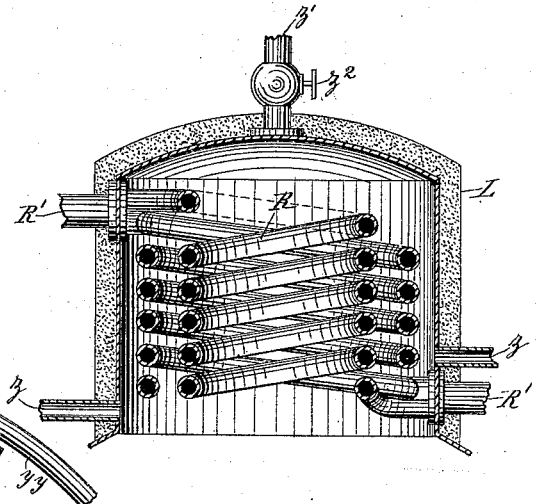

The lagging incidentally referred to is designed for any or all of the heaters, but is generally used only on locomotives and in exposed situations. This lagging may cover the heater completely, if desired, or only the dome, the pipes, cocks, and other appliances being driven through the lagging and secured to the heater-shell; or, in other words, placed in places left for them. The top of this lagging and covering may be made with the top of the heater and arranged to come off in the same manner that I remove the top plate or shell of the heater in construction shown in Fig. 5. The heater is supplied with braces or stay-bolts to give strength to the shell and to hold the pipes in working position or proper order. The stays are in this instance the customary rod of iron with a thread cut on it. They may extend through the shell and be supplied with a nut or be riveted into a head at either or both ends. They will be driven through the heater in either direction, as shown in the drawings, wherever necessary. Either the top or the bottom sheet forming the metal shell of these heaters may be made to fit into or down onto the upright sheet and be secured to the latter by tap or other bolts, making a steam and water tight connection, by first fitting a ring of metal or gum packing between the two sheets, so that the pipe or pipes within the heater-shell may be readily adjusted or changed. These pipes being usually supplied with collars, and the heads of the holding-bolts having been first countersunk into these collars to prevent the bolts from turning when using the wrench in applying the nuts on the outside of the shell, the outside pipes or extensions may or may not be secured by these same bolts. When the two coils within the shell communicate with a single outlet-pipe, the latter is usually tap-bolted to either the heater-shell or to the lagging.

The pipes within the heater-shell, whether carrying water or exhaust-steam, are made as light as circumstances will permit, usually one-fourth or one-half the thickness of the outer extensions, using copper, brass, or iron pipe, as best suited to the special case. When carrying exhaust they are made of large proportions, and usually given only a few turns or coils, so as not to impede the exhaust, and when carrying water they are made of suitable diameter and given the greatest possible number of coils, the pipes being located one inside of the other, or one on top of the other, as desired, and only a short space apart. The exhaust may enter at bottom and go out at the top, or enter at top and go out at bottom when to be thrown into a receptacle or cold-water tank.

Figure 1:
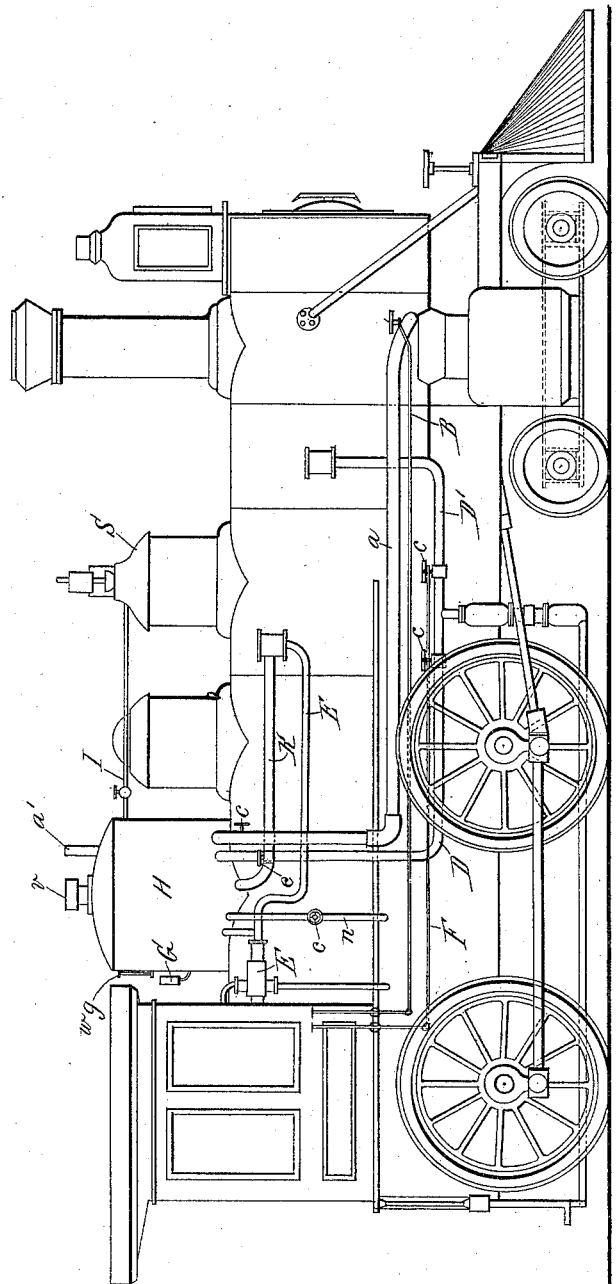
Figure 2:
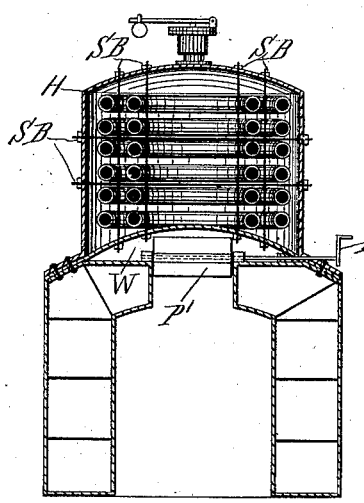
Figure 3:
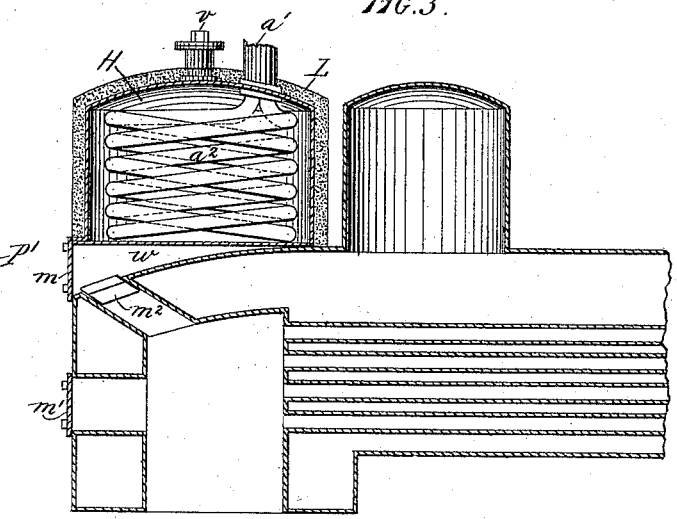
Figure 4:
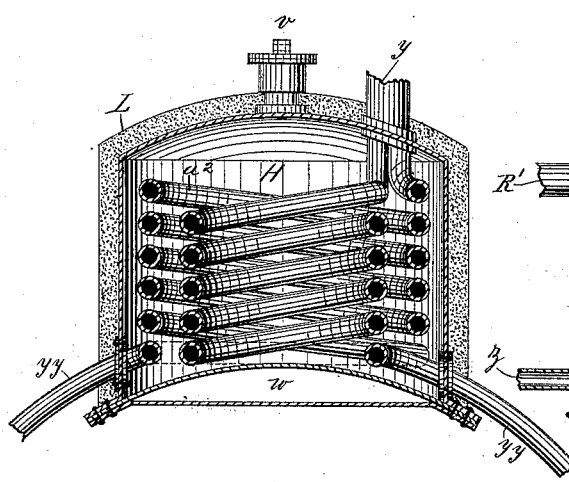

The rods F and B (shown in Fig. 1) may take any position along the side of an engine or boiler. They are usually made straight and secured to the top or bottom of foot-board. When provided with an upright bar, a bolt is driven through the bar two or three inches from the knuckle to make it a lever.

Having thus described my invention, what I claim as new, and desire to secure by Letters Patent, is—

1. In a feed-water heater, the combination of a tank having a portion of its surface forming a heating-chamber with a furnace and exhaust-steam pipes within its tank, said chamber having a connection with the furnace, all substantially as shown, and for the purpose described.

2. In a feed-water heater, the combination of a tank with a furnace, a passage between said furnace and tank, and a valve for controlling the heat from the furnace to the tank, substantially as shown and described.

3. In a feed-water heater, the combination of a tank with a furnace, a passage between said furnace and tank, a valve for controlling heat from the furnace to the tank, and exhaust-pipes passing through the tank, all substantially as shown and described.

4. In a feed-water heater, the combination of a tank with a furnace, a chamber formed between the boiler and the tank and communicating with the furnace, exhaust-pipes passing through the tank, and a valve for controlling the heat of the furnace to the tank, and a valve for directing the exhaust through the tank or up the stack, substantially as shown and described.

In testimony that I claim the foregoing as my own I affix my signature in presence of two witnesses.

OSCAR ROTHROCK.

Witnesses:
E. V. SKINNER,
E. T. MONETT.